May 29, 1956

J. B. FRAGA 2,747,484

TRACTOR MOUNTED TOOL BAR

Filed Dec. 5, 1952

INVENTOR.
JOHN B FRAGA
BY

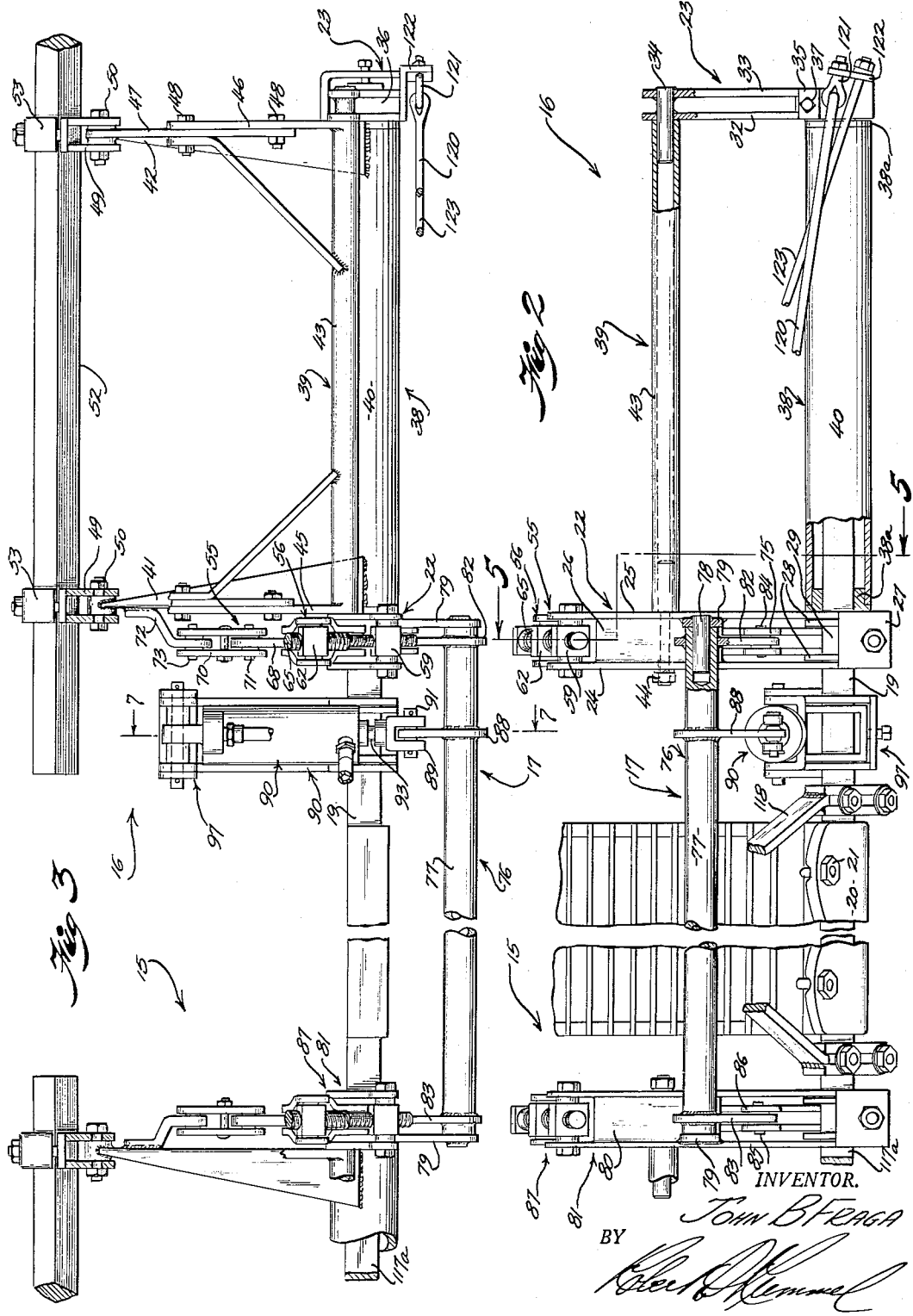

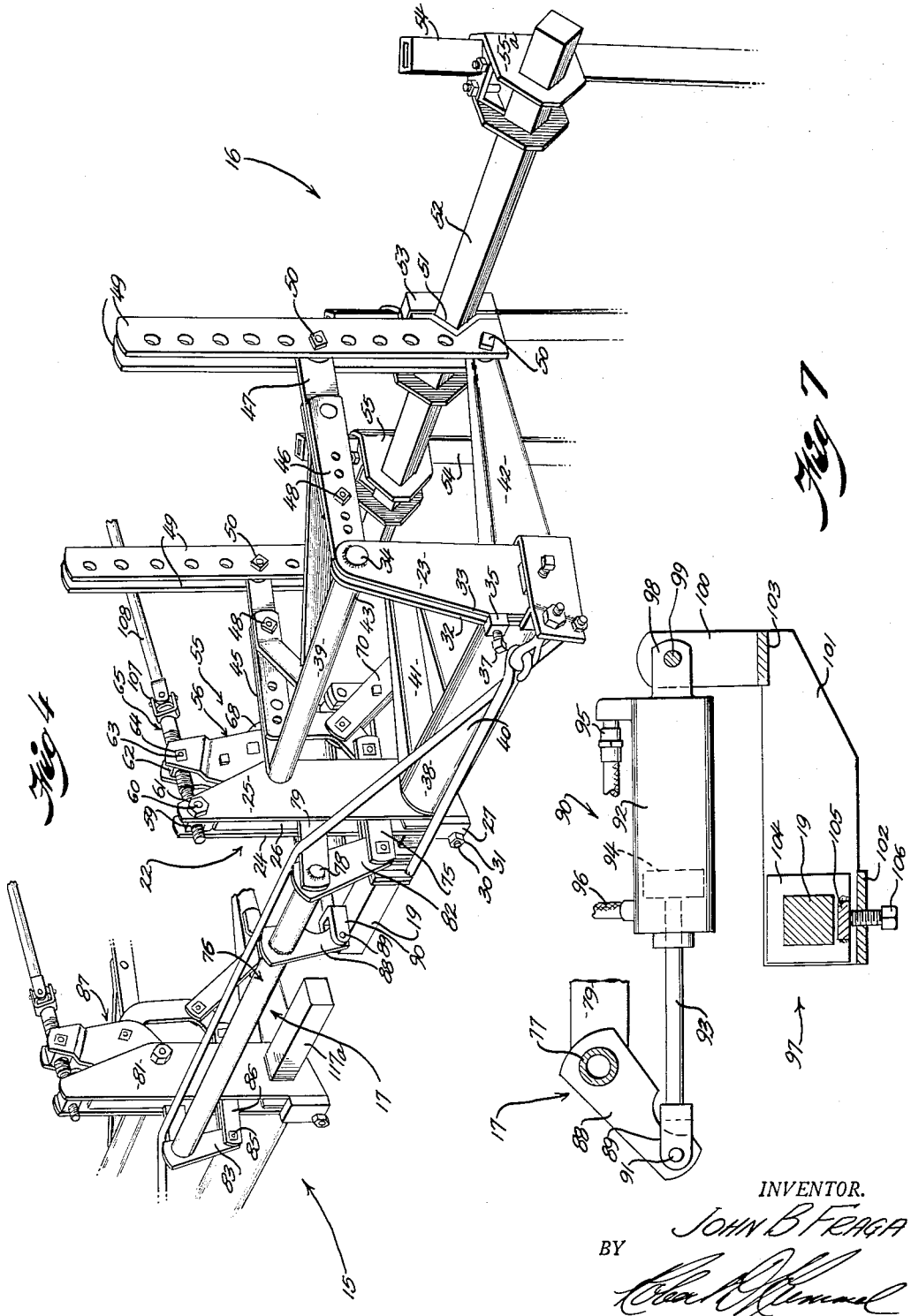

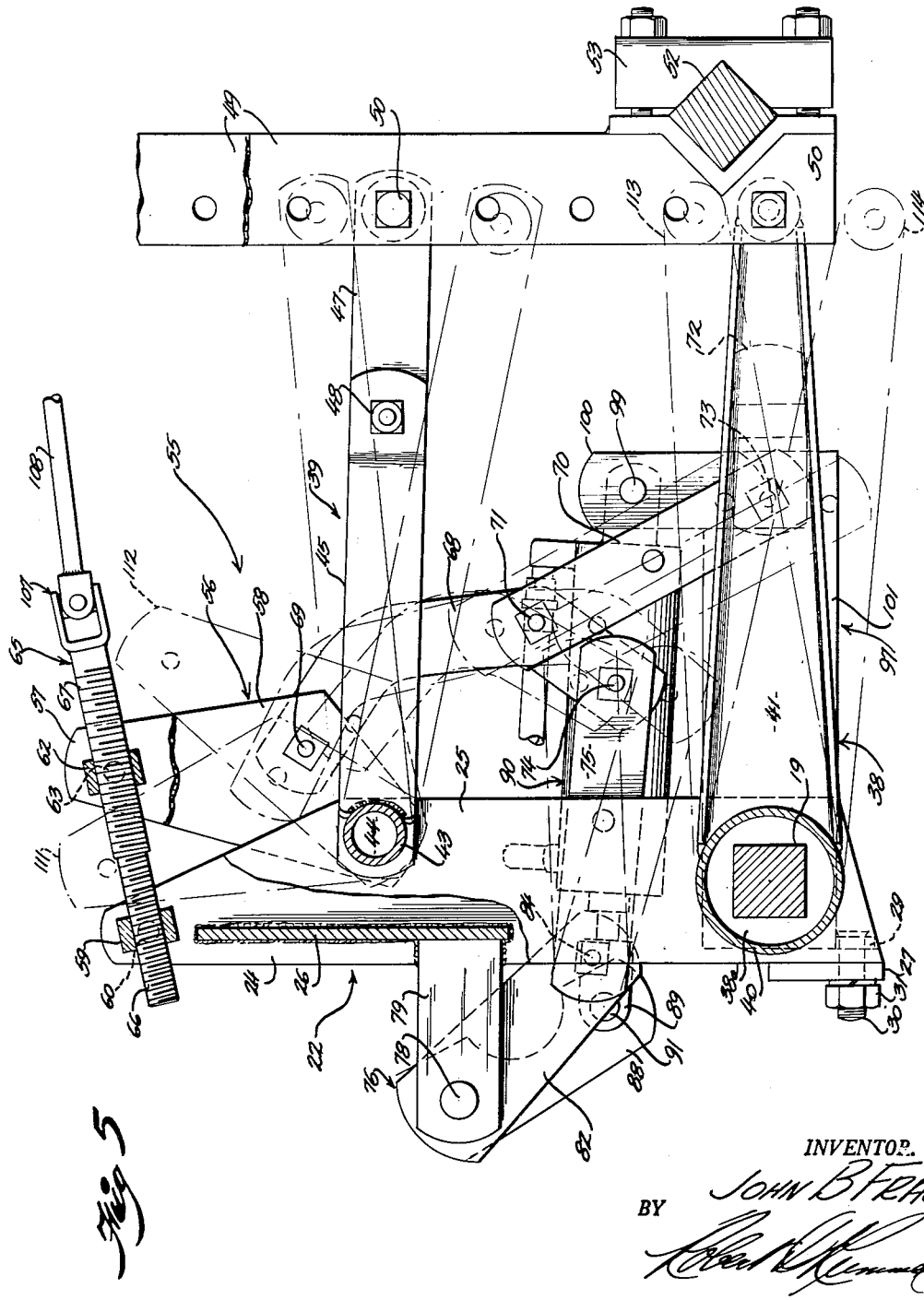

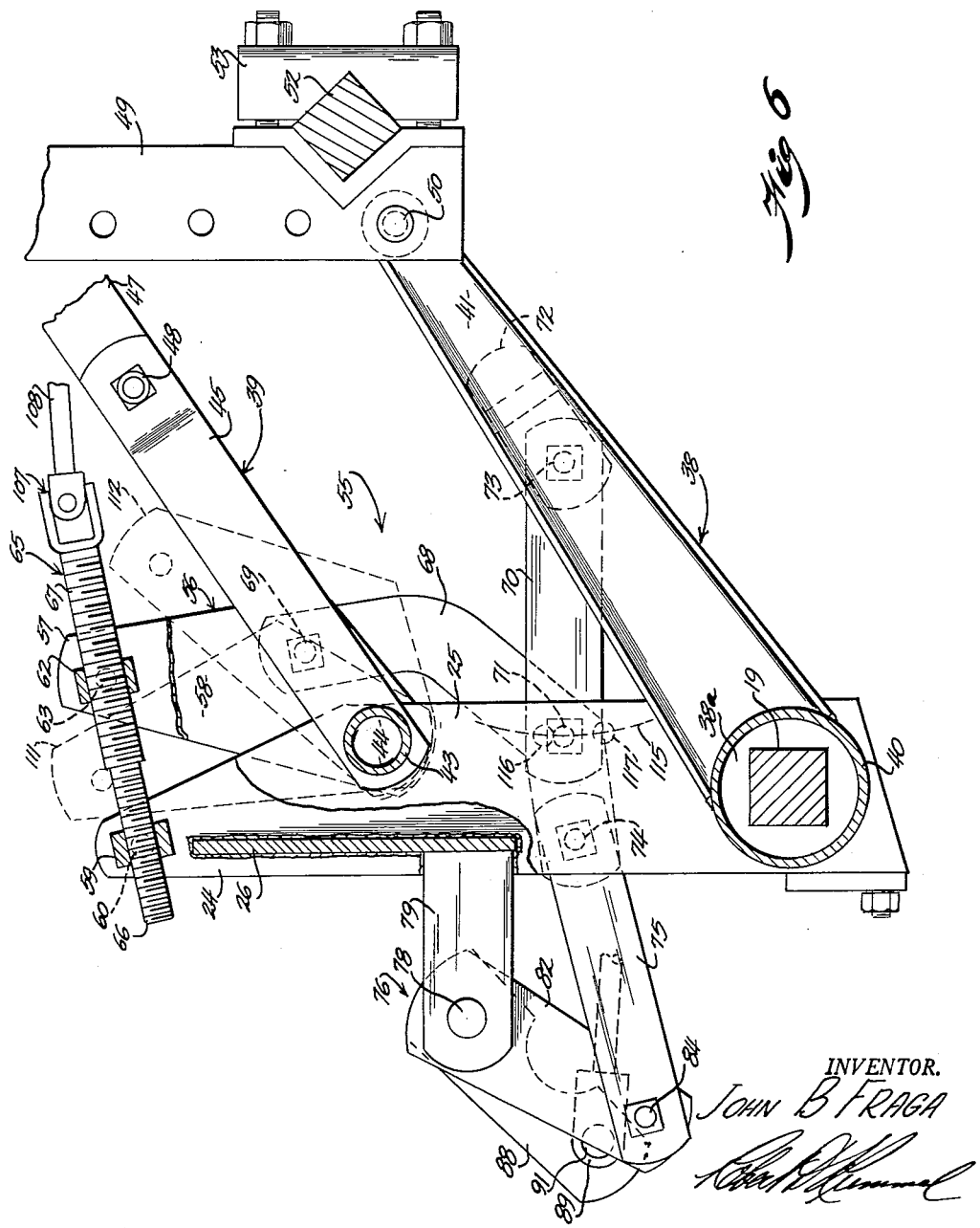

United States Patent Office 2,747,484
Patented May 29, 1956

2,747,484

TRACTOR MOUNTED TOOL BAR

John B. Fraga, Stockton, Calif., assignor to J. I. Case Company, Racine, Wis., a corporation of Wisconsin Application December 5, 1952, Serial No. 324,369

10 Claims. (Cl. 97—46.51)

The present invention relates to a tractor mounted cultivating implement, and the primary object of the present invention is to generally improve the operation and construction of implements of this type.

A further object of the present invention is to provide a tractor-mounted cultivator implement having a cultivator rig and a precision control mechanism in association with the cultivator rig for moving the ground working tools of the cultivator rig from a working position to an elevated or transport position, this precision control mechanism including power operated means for moving the ground working tools from a working position to a transport position and manually operative means in association therewith for changing the working depth of the ground working tools without appreciably altering the height of lift of the ground working tools as effected by the power operated means.

The manner in which these objects are accomplished will be apparent from the following specification and accompanying drawings in which said embodiments of the invention are shown, but it is to be understood that the invention is not limited to the details disclosed but includes all such variations and modifications as follow within the spirit of the invention as herein expressed.

In the drawings:

Fig. 1 is a front view of a cultivator, illustrative of the present invention, shown in combination with a tractor, with parts removed.

Fig. 2 is a view similar to Fig. 1, slightly enlarged, showing certain details in construction and with parts removed.

Fig. 3 is a plan view of the cultivator shown in Fig. 2 with parts removed.

Fig. 4 is a left-front perspective view of the structure shown in Fig. 3, with parts removed.

Fig. 5 is a cross sectional view taken on the line 5—5 of Fig. 2, slightly enlarged.

Fig. 6 is a view similar to Fig. 5 and illustrating the mechanism when the lifting arrangement is in its raised position.

Fig. 7 is a sectional view taken on the line 7—7 of Fig. 3 slightly enlarged and with parts removed.

Referring to Figs. 1, 2, 3, and 4 of the drawings, a tractor-mounted cultivator, illustrative of the present invention, is broadly designated by the number 10, and is shown in combination with a tractor 11.

The tractor 11 can be of any suitable or well-known construction and comprises in general a front portion 12 which is movably supported by a front wheel truck 13, and a rear portion, not visible in the drawings since the details thereof have no bearing on the present invention, but which is movably supported by rear traction wheels 14.

The cultivator 10 consists of two cultivator sections or rigs 15 and 16 which are carried on the opposite sides of the tractor adjacent the forward end thereof and which are interconnected by means of a lifting arrangement 17 so that cultivating tools 18 associated with each of the rigs are capable of being rocked from a working position to a transport position in unison. Since the details of construction of cultivator rig 15 are identical to the details of construction of cultivator rig 16, further discussion of the construction of these cultivator rigs will be limited to the construction of cultivator rig 16, except insofar as construction of both of the cultivator rigs is deemed necessary in order to fully describe the operation and construction of cultivator 10.

Cultivator rig 16 is composed in the present instance of a transverse bar 19 which is substantially square in cross section and which is received at its inner end in a transverse socket formed for convenience in the front wheel truck 13, this socket being preferably of the type shown and described in the patent to Geraldson 1,914,117 and including in the present instance a keeper 20 rigidly secured to the main casting of the wheel truck 13 as by bolt or the like 21, the bar 19 being so supported as to extend laterally from the tractor in a plane substantially parallel to the horizontal.

A main standard 22 is suitably clamped to the bar 19 adjacent the truck 13, and a secondary standard 23 is also clamped to the tool bar 19 and laterally spaced from the standard 22. The standard 22 in the present instance is of fabricated construction and is composed of plates 24 and 25 which are fixed in spaced relationship by means of suitable spacers 26 and 27, spacers 26 and 27 being rigidly fixed to the respective plates 24 and 25 as by welding or the like. The lower ends of plates 24 and 25 are suitably apertured for receiving therein the bar 19, and a pair of wrenching plates 28, also suitably apertured, are received by the bar 19 between the plates 24 and 25. A wrench block 29 is rigidly fixed between the plates 28 and carries adjacent its lower end a forwardly extending screw 30, see also Fig. 5. Screw 30 is received forwardly in a suitable aperture formed in spacer 27, and a nut 31 is threadedly received on the screw 30 for causing a wrenching effect of plates 28 and plates 22 and 24 relative to one another and of a degree sufficient to secure standard 22 rigidly to bar 19 in an upwardly extending condition. Standard 23 is also of fabricated construction and includes in the present instance plates 32 and 33 held in spaced relationship by means of a suitable transverse inwardly extending pin 34 and spacer 35, pin 34 and spacer 35 being fixed as by welding or the like to the respective plates 32 and 33. The plates 32 and 33 are suitably apertured so as to receive the bar 19 and a wrench block 36, which also has an aperture formed therein, is received by the bar 19 between the plates 32 and 33. A cap screw 37 is threaded into a suitable aperture formed in the spacer 35 and is so positioned as to move into abutting relationship with respect to wrenching block 36 so that the same is capable of use for effecting wrenching of block 36 with respect to plates 32 and 33 for rigidly fixing standard 23 to bar 19 in an upwardly extending position.

A lower rockable member 38 is rotatably carried on shouldered bushings 38a on the bar 19 between the standards 22 and 23, and an upper rockable member 39 is vertically spaced from the rockable member 38 and rotatably carried between the standards 22 and 23, being journaled on pin 34 and a pin to be described presently. Rockable member 38 comprises in the present instance a tubular member 40, the standards 22 and 23 being so spaced on the bar 19 as to prevent substantially all axial play of the tubular member 40 therebetween. Rearwardly extending aligned lift arms 41 and 42 are fixed as by welding or the like to the tubular member 40 adjacent the opposite ends thereof. The rockable member 39 consists of a tubular member 43 which rotatably receives adjacent its respective ends that portion of pin 34 extending inwardly from plate 32 and that portion of a pin 44 extending laterally from plate 25, pin 34, and pin 44 extending toward one another and being substantially co-axial and parallel to bar 19. The tubular member 43 has fixed to the opposite ends thereof as by welding or the like rearwardly extending aligned lift arms 45 and 46, and the lift arms 45 and 46 are each longitudinally adjustable and each includes an extension bar 47 rigidly secured to the respective arms 45 and 46 as by bolts or the like 48. The arms 41 and 45, and 42 and 46, are joined in a vertical direction by means of tool supporting bars 49, the tool supporting bars 49 being suitably apertured and secured to the opposite sides of the lift arms 41, 45, 42, and 46 by means of suitable bolts or the like 50. It will be appreciated that the upper arms 45 and 46 are preferably carried in substantially parallel relationship with respect to the lower arms 42 so as to effect a parallelogram with respect to the standards 22 and 23 and the tool supporting bars 49.

The tool supporting bars 49 have formed adjacent their lower ends horizontally aligned notches 51, Fig. 4, and a cultivator tool bar 52 is received in these notches 51. A suitable clamp 53 of any well-known or suitable construction is provided for rigidly securing the tool bar 52 to each set or pair of tool supporting bars 49. The cultivator tool bar 52 supports a plurality of depending tool shanks 54 and the tool shanks 54 are rigidly secured to the cultivator tool bar 52 by means of clamps 55a of any suitable or well-known construction, the tools 18 being suitably fixed to the shanks 54 in any suitable manner.

The lifting arrangement 17 has as a part thereof a lifting linkage associated with the cultivator rig 16 designated broadly as number 55, Fig. 5. The lifting linkage 55 consists of a swingable member or bell crank 56 which is fabricated from spaced apart plates 57 and 58, bell crank 56 being pivotally carried between the plates 24 and 25 of standard 22 by means of above mentioned pin 44. Adjacent the upper end of standard 22 is carried a nut 59 which has a threaded aperture formed therein and which also has transverse trunnions 60 extending from the opposite sides thereof. The trunnions 60 are received in suitable apertures formed in the plates 24 and 25 of standard 22 so as to permit rotative movement of the nut 59 about an axis substantially parallel to the bar 19, and suitable lock nuts 61 are threaded on the ends of trunnions 60 for positioning the nut 59 between the plates 24 and 25. A nut 62, similar in construction to nut 59, is carried adjacent the upper end of bell crank 56, the nut 62 having transverse trunnions 63 extending from the opposite sides thereof and the plates 57 and 58 having fixed therein suitable apertured inserts 64 for rotatably supporting the trunnions 63, nut 62 being rockable about an axis substantially parallel to the axis of trunnions 60 of nut 59. The aperture of nut 59 is threaded so as to receive in the present instance a right-handed screw therein and the aperture of nut 62 is threaded so as to receive a left-handed screw therein, and an adjusting screw 65 having a threaded portion 66, threaded so as to be received in the aperture formed in the nut 59, and a threaded portion 67, threaded so as to be received in the aperture formed in the nut 62 and conveniently of a greater diameter than the portion 66, is provided for interconnecting the bell crank 56 to the standard 22. It will be appreciated that bell crank 56 is swingable about the axis of pin 44 when the adjusting screw 65 is turned so as to move the lock nut 62 toward the lock nut 59 or away from the lock nut 59. Since portion 66 of screw 65 has a right-hand thread and the portion 67 has a left-hand thread, nuts 59 and 62 will move axially of screw 65 in opposite directions when the screw is turned. Furthermore the nuts 59 and 62 will approach or recede from each other at twice the rate which would result from prior known arrangements, whereas the angle of the thread need not be steep enough to make the device reversible. In other words the angle does not need to be so steep that thrust on the nuts might cause undesired rotation of the screw and consequent loss of adjustment.

The bell crank 56 is connected between pin 44 and nut 62 to one end of an arcuate shaped link 68 by means of a suitable pivot pin 69, and a pair of connecting links 70 are pivotally secured to the opposite sides of the arcuate shaped link 68 adjacent the lower end thereof by means of a suitable pivot pin 71. The other ends of the connecting links 70 are connected to an inwardly displaced bracket 72 (Fig. 3) by means of a suitable pivot pin 73, bracket 72 being fixed to arm 41 as by welding or the like. The arcuate shaped link 68 extends forwardly from its pivotal connection with the connecting links 70 and is pivotally connected adjacent its forward end by means of a suitable pivot pin 74 to a pair of forwardly extending actuating links 75, actuating links 75 being positioned above the bar 19 and passing freely between the plates 24 and 25 of standard 22.

The lifting arrangement 11 further includes as a part thereof a rock shaft 76, the rock shaft 76 in the present instance being composed of a tubular member 77 which rotatably receives in the opposite ends thereof suitable inwardly extending co-axial trunnions 78 (Fig. 2) fixed as by welding or the like in forwardly extending brackets 79, only one of the trunnions 78 being visible in the drawings. Brackets 79 are in turn fixed as by welding or the like to the spacer 26 of standard 22 and to a spacer 80 of a standard 81, standard 81 being associated with cultivator rig 15 and being identical in construction to the standard 22 of cultivator rig 16. The opposite ends of the rock shaft 76 have fixed thereto depending aligned rock arms 82 and 83, and the distal end of the rock arm 82 is pivotally connected by means of a suitable pivot pin 84 to the actuating links 75 adjacent the forward ends thereof. The distal end of the rock arm 83 is pivotally connected by means of a suitable pivot pin 85 to actuating links 86 adjacent the forward ends thereof, the cultivator rig 15 having a lifting linkage, broadly designated as 87, which is identical in construction to the lifting linkage 55 of cultivator rig 16.

The rock shaft 76 also has fixed thereto a downwardly depending crank 88 which is connected to a clevis 89 of a hydraulic motor 90 by means of a suitable attaching pin 91, see also Fig. 7. The hydraulic motor 91 is capable of being of any suitable or well-known type and includes in the present instance a cylindrical portion 92 and a piston rod 93, rod 93 being fixed adjacent one end thereof to clevis 89 and adjacent the other end thereof to a suitable piston 94 which is slidably received in the cylindrical portion 92. The tractor 11 includes as a part thereof a suitable hydraulic system, not visible in the drawings, which is connected to the hydraulic motor 92 by means of suitable conduits 95 and 96, this hydraulic system being of the type which is under complete control of the operator so that selective axial movement of the piston rod 93 can be effected as well-known in the art.

A suitable anchorage 97 is carried by the bar 19 adjacent standard 22 for supporting the other end of the cylindrical portion 92. More specifically a tongue 98 is formed adjacent the rearward end of the cylindrical portion 92 and a suitable attaching pin 99 supports the tongue 98 between upwardly extending anchorage brackets 100. Anchorage brackets 100 are fixed as by welding or the like to rearwardly extending spaced apart rigid plates 101, plates 101 being received by the bar 19 and being rigidly held in spaced apart relationship by means of spacers 102 and 103. A pair of wrenching plates 104 is also received by the bar 19 between the plates 101, and a wrenching block 105 is fixed between the plates as by welding or the like. The spacer 102 has a threaded opening formed therein and a screw 106 is threadedly received in this opening and abuts wrenching block 105 upon the same being threaded sufficiently in the opening for effecting a wrenching action between the plates 104 and 101 for rigidly fixing anchorage 97 in its proper position to bar 19.

The above mentioned adjusting screw 65 has fixed to the rearward end thereof a suitable universal coupling 107, and a rod 108 is fixed adjacent its forward end to one member of coupling 107 so as to cause rotative movement of screw 65 when the rod 108 is turned. The rod 108 extends rearwardly and is rotatably supported adjacent the operator's station on the tractor by means of a suitable supporting structure 109 suitably carried by the tractor and a suitable handle 110 is provided adjacent the rearward end of the rod 108 within convenient reach of the operator so that the operator from his station on the tractor may rock the bell crank 56 about the axis of pin 44.

Referring specifically to Fig. 5, the lifting linkage 55 is shown in its operative position, the hydraulic motor 90 being in its retracted position and the lift arms 41, 42, 45, and 46 being positioned substantially parallel to the horizontal. The bell crank 56 as previously suggested, is capable of being held in various angular positions with respect to standard 22 from its maximum forward position, which is shown in dotted lines and designated by the number 111 to its maximum rearward position, which is also shown in dotted lines and represented by the number 112, the full line position of the bell crank 56 being substantially medially between its maximum forward position and its maximum rearward position. When the bell crank 56 is locked in its substantially medial position, represented by the full lines, the arcuate shaped links 68 and the connecting links 70 in cooperation with the actuating links 75 are so proportioned as to support the lift arm 41 in a position substantially parallel to the horizontal. It will be appreciated that link 68 and connecting links 70 are in the form of a toggle linkage, and the centers of their attaching pins 69, 71, and 73 lie in substantially the same plane when the bell crank 56 is locked in its substantial medial position. This means that stresses originating along the arms 41 and 42 are transmitted directly to standard 22 through the connecting links 70, the arcuate shaped link 68, the bell crank 56, and the screw 65. The resultant effect of this construction is that the arms 41 and 42 are stable and springing due to stresses in the various parts is not translated into lost motion allowing fluctuating of the tool setting. When the rod 108 is turned in one direction sufficiently to move the bell crank 56 from its position shown in full lines to its maximum forward position shown in dotted lines at 111, the link 68 is moved upwardly and forwardly about the axis of pin 44, and this displacement of link 68 is sufficient to swing the lift arm 41 from its full line position to its position shown in dotted lines and designated by the number 113. Upon sufficient turning of the rod 108 in the opposite direction, the bell crank 56 can be rocked rearwardly to its maximum angled position with respect to standard 22, this position being shown in dotted lines and represented by number 112. The link 68 will then be moved downwardly and as seen in dotted lines a distance sufficient to position the lift arm 41 in a slightly downwardly inclined position which is shown in dotted lines and represented by the number 114. It will be noted that in moving the lift arm 41 from its full line position to its position shown in dotted lines and represented by the number 113 or to its position shown in dotted lines and represented by the number 114 that the center of pivot 71 has been moved slightly to one side or the other of a plane through the center of pivot pin 69 and the center of pivot pin 73. However, this misalignment of the center of pivot pin 71 is so slight that substantially all stresses originating along the arms 41 and 42 are still transmitted directly to standard 22 through the connecting links 70, link 68, bell crank 56, and screw 65. It will be appreciated that the adjustment of bell crank 56, such for instance as moving the same from its full line position to its positions shown at 111 and at 112 so as to effect swinging of the lift arm 41 from its full line position to its position shown at 113 or 114 is wholly independent of the hydraulic motor 42 and the rock shaft 76 and is most effective for accurately regulating the depth at which the shovels 18 perform their cultivating function.

For swinging the arms 41 and 42 upwardly from their working position to their transport position, the bell crank 56 being in its medial angular position with respect to standard 22 as viewed in solid lines in Fig. 5, the hydraulic motor 90 is actuated so that the piston rod 93 thereof is extended forwardly, this in turn rocking the rock shaft 76 in a direction so as to cause the rock arm 82 thereof to swing forwardly, see Fig. 6. Upon the distal end of the rock arm 82 swinging forward in the path indicated, the toggle linkage, which comprises arcuate shaped links 68 and connecting links 70 is caused to buckle forwardly by reason of the actuating links 75. When the piston rod 93 of the hydraulic motor 90 is extended a predetermined distance, the toggle linkage will be caused to buckle sufficiently to swing the lift arm 41 to its raised position, and this position is so calculated as to raise the cultivating tools 18 a predetermined distance from the ground. The lifting link is so constituted that the lift arm 41 is swung into substantially the same rearwardly and upwardly inclined position upon extension of the piston rod 93 a predetermined amount regardless of whether the lift arm 41 is positioned in its full line position as viewed in Fig. 5 or in its dotted line positions as represented by the dotted lines 113 and 114. It will be noted in Fig. 6 that upon the toggle links 68 and 70 being buckled sufficiently to swing the lift arm 41 into its raised position, that the pin 71 is caused to move substantially in an arc drawn from the center of pin 73 through the center of pin 71 when the bell crank 56 is angularly adjusted with respect to standard 22 from its maximum rearward position to its maximum rearward position. This arc of travel is represented by the number 115 and the number 116 represents the pivot pin 71 when the bell crank 56 is in its maximum forward position as represented by 111. The dotted circle numbered 117 represents the pivot pin 71 when the bell crank 56 is in its maximum angular position with respect to standard 22 as represented by number 112. It will be appreciated that the center of pin 71, whether the bell crank 56 is in its full line position, its position represented by number 111, or its position represented by number 112, lie in the arc 115 and that up and down deflection of the centers of pin 71 on the arc 115 has substantially no effect upon the center of pin 73 so that regardless of the angular position of the bell crank 56 with respect to standard 22, the lift arm 41 is swung at all times into its maximum rearward inclined position upon a predetermined extension of piston rod 93.

In other words, as apparent in Fig. 6, in the lifted position of the parts, pin 71 is substantially in dead-center relation to pin 73, while at the same time it is substantially in dead-center relation to pins 74 and 84, so that adjustment of screw 65 will have substantially no effect on the position of pin 73 when the rigs are raised.

As previously suggested the cultivator rig 15 has a lifting linkage 87 which is identical in construction to the lifting linkage 55 of cultivator rig 16. Therefore, when the rock shaft 76 is rocked in a lifting direction by the hydraulic motor 90, the cultivating tools 18 of cultivator rig 15 will be moved into their transport position in unison with the cultivating tools 18 associated with cultivator rig 16. It will be appreciated however that the mechanism for effecting fine adjustment of the cultivating tools 18 associated with rig 16 are operable independently of the mechanisms associated with cultivator rig 15 for effecting fine adjustment of the cultivating tools associated with the latter.

Bar 19 and a similar bar 117a associated with cultivator rig 15 and identical in construction to bar 19, are braced by means of suitable braces 118 suitably clamped to the respective bars adjacent the tractor, the braces 118 converging upwardly and being secured by bolts 119 to the wheel truck 13 of the tractor. Additional braces 120 are secured by bolts 119 and laterally fixed by means of suitable eye bolts 121 to suitable brackets 122 fixed to the ends of the bars 19 and 117a. Still another brace 123 extends between the brackets 122 and upwardly and over arms 79 of standard 22 and 87. This brace is formed in two parts and interconnected by means of a suitable turn buckle 124.

What I claim:

1. In combination with a tractor, a tractor-mounted cultivator comprising a transverse tool bar secured to said tractor adjacent one end thereof and extending laterally therefrom, a lift arm carried by said tool bar and rockable about an axis transverse to the direction of travel of the tractor, an upwardly extending standard rigidly secured to said tool bar adjacent said lift arm, a toggle linkage connected with said lift arm and with said upwardly extending standard at a point spaced above said transverse tool bar, an actuating link pivotally connected to said toggle linkage adjacent the apex thereof, a transverse rock shaft carried by said tractor, said rock shaft having formed thereon a rock arm, power transmitting means carried by said tractor for rocking said rock shaft in one direction, pivot means for connecting said rock arm to said actuating link wherein upon said rock shaft's being rocked in said one direction, said toggle linkage is caused to buckle sufficiently to swing said lift arm upwardly from a working position to a transport position.

2. In combination with a tractor, a tractor-mounted cultivator comprising a transverse tool bar secured to said tractor adjacent one end thereof and extending laterally therefrom, a lift arm carried by said tool bar and rockable about the axis thereof, an upwardly extending standard rigidly secured to said tool bar adjacent said lift arm, a toggle linkage connected with said lift arm and with said upwardly extending standard at a point spaced above said transverse tool bar, an actuating link pivotally connected to said toggle linkage adjacent the apex thereof, a transverse rock shaft carried by said tractor, said rock shaft having formed thereon a rock arm, power operated means connected with said tractor and carried by said tool bar for rocking said rock shaft in one direction, pivot means for connecting said rock arm to said actuating link wherein upon said rock shaft's being rocked in said one direction, said toggle linkage is caused to buckle sufficiently to swing said lift arm upwardly from a working position to a transport position.

3. In combination with a tractor, a tractor-mounted cultivator comprising a transverse tool bar secured to said tractor adjacent one end thereof and extending laterally therefrom, a lift arm carried by said tool bar and rockable about the axis thereof, an upwardly extending standard rigidly secured to said tool bar adjacent said lift arm, a toggle linkage connected between said lift arm and said upwardly extending standard at a point spaced substantially upward from said transverse tool bar, an actuating link pivotally connected to said toggle linkage adjacent the apex thereof, a transverse rock shaft carried by said tractor, said rock shaft having formed thereon a rock arm, power operated means connected with said tractor and carried by said tool bar for rocking said rock shaft in one direction, pivot means for connecting said rock arm to said actuating link wherein upon said rock shaft's being rocked in said one direction, said toggle linkage is caused to buckle sufficiently to swing said lift arm upwardly from a working position to a transport position, said toggle linkage being in longitudinal alignment when said lift arm is in working position.

4. In combination with a tractor, a tractor-mounted cultivator comprising a transverse tool bar secured to said tractor adjacent one end thereof and extending laterally therefrom, a lift arm carried by said tool bar and rockable about an axis transverse to the direction of travel of said tractor, an upwardly extending standard rigidly secured to said tool bar adjacent said lift arm, a rockable member pivotally secured to said standard at a point substantially above said transverse tool bar and rockable about an axis parallel to the axis of said tool bar and vertically disposed with respect thereto, an interconnecting means between said rockable member and said standard for rocking said rockable member with respect thereto and for holding said rockable member in various angular positions with respect thereto, a toggle linkage interconnected between said rockable member and said lift arm, an actuating link pivotally connected to said toggle adjacent the apex thereof, a transverse rock shaft carried by said tractor, said rock shaft having formed thereon a rock arm, power operated means connected with said tractor for rocking said rock shaft in one direction, pivot means for connecting said rock arm to said actuating link wherein upon said rock shaft's being rocked in said one direction, said toggle is caused to buckle sufficiently to swing said lift arm upwardly from a working position to a transport position, said interconnecting means for rocking said rockable member being capable of effecting fine adjustment of said lift arm upon said lift arm's being moved into its working position by means of said rock shaft.

5. In combination with a tractor, a tractor-mounted cultivator comprising a transverse tool bar secured to said tractor and extending laterally therefrom, a lift arm carried by said tool bar and rockable about the axis thereof, an upwardly extending standard secured to said tool bar adjacent said lift arm, a rockable member pivotally secured to said standard and rockable about an axis substantially parallel to the axis of said tool bar and vertically disposed with respect thereto, a rotatable screw interconnecting said rockable member and said standard and capable of angularly adjusting said rockable member with respect to said standard upon being rotated in one direction, a toggle linkage interconnected between said rockable member and said lift arm, an actuating link pivotally connected to said toggle linkage adjacent the apex thereof, a transverse rock shaft carried by said tractor, said rock shaft having formed thereon a rock arm, pivot means for connecting said rock arm to said actuating link, and power operated means carried by said tool bar and connected to said rock shaft for rocking said rock shaft in one direction for causing said toggle linkage to buckle sufficiently to swing said lift arm upwardly from a working position to a transport position, and means connected to said screw for causing rotation thereof for angularly adjusting said rockable member for effecting a fine adjustment of said lift arm.

6. In combination with a tractor, a tractor-mounted cultivator comprising a transverse tool bar secured to said tractor and extending laterally therefrom, a lift arm carried by said tool bar and rockable about the axis thereof, an upwardly extending standard secured to said tool bar adjacent said lift arm, a rockable member pivotally secured to said standard and rockable about an axis substantially parallel to the axis of said tool bar and vertically disposed with respect thereto, a rotatable screw interconnecting said rockable member and said standard and capable of angularly adjusting said rockable member with respect to said standard upon being rotated in one direction, a toggle linkage interconnected between said rockable member and said lift arm and so constituted as to be in substantial longitudinal alignment when said lift arm is in a working position, an actuating link pivotally connected to said toggle linkage adjacent the apex thereof, a transverse rock shaft carried by said tractor, said rock shaft having formed thereon a rock arm, pivot means for connecting said rock arm to said actuating link, and power operated means carried by said tool bar and connected to said rock shaft for rocking said rock shaft in one direction for causing said toggle linkage to buckle sufficiently to swing said lift arm upwardly from a working position to a transport position, and means connected to said screw for causing rotation thereof for angularly adjusting said rockable member for effecting a fine adjustment of said lift arm.

7. In combination with a tractor, a tractor-mounted cultivator comprising a transverse tool bar secured to said tractor and extending laterally therefrom, a lift arm carried by said tool bar and rockable about the axis thereof, an upwardly extending standard secured to said tool bar adjacent said lift arm, a rockable member pivotally secured to said standard and rockable about an axis substantially parallel to the axis of said tool bar and vertically disposed with respect thereto, a rotatable screw interconnecting said rockable member to said standard and capable of angularly adjusting said rockable member with respect to said standard upon being rotated in one direction, a downwardly depending link pivotally secured to said rockable member, a connecting link interconnected between said depending link adjacent the end thereof and said lift arm for causing upward swinging of said lift arm upon said links' being buckled, an actuating link pivotally secured to one of said links adjacent the pivotal connections of said links, a transverse rock shaft rotatably carried by said tractor, said rock shaft having formed thereon a rock arm, pivot means for connecting said rock arm to said actuating link, and power operated means carried by said tool bar and connected to said rock shaft for rocking said rock shaft in one direction for causing said links to buckle sufficiently to swing said lift arm upwardly from a working position to a transport position, and means connected to said screw for causing rotation thereof for angularly adjusting said rockable member with respect to said standard for effecting fine adjustments of said lift arm.

8. The combination with a tractor, of a tractor-mounted cultivator comprising a main tool bar transversely supported by said tractor and extending to one side thereof, a lift arm carried by said tool bar and rockable about the axis thereof, and upwardly extending standard secured to said tool bar adjacent said lift arm, a second lift arm vertically spaced from the first mentioned lift arm and pivotally connected to said standard, a tool supporting bar vertically connecting said lift arms, a rockable member carried by said standard and swingable about an axis parallel to the axis of said tool bar and vertically disposed with respect thereto, adjustable means interconnected between said standard and said rockable member at a point remote from its pivotal connection to said standard for securing said rockable member in various angular positions with respect to said standard, a toggle linkage interconnected between said rockable member and the first mentioned lift arm, an actuating link pivotally connected adjacent one end thereof to said toggle adjacent the apex thereof, a transverse rock shaft rotatably supported by said tractor, said rock shaft having formed at one end thereof a rock arm, power operated means carried by the tool bar and connected to said rock shaft for rocking said rock shaft in one direction, and a pivotal connection between said rock arm and said actuating link whereby said toggle linkage is caused to buckle in response to said rock shaft's being rocked in said one direction wherein said first mentioned lift arm is moved from a working position to a raised position, said adjusting means being capable of effecting a fine adjustment of said first mentioned lift arm upon said rockable member's being rocked into adjusted angular relationship with respect to said standard.

9. The combination with a tractor, of a tractor-mounted cultivator comprising a main tool bar transversely supported by said tractor and extending to one side thereof, a lift arm carried by said tool bar and rockable about the axis thereof, an upwardly extending standard secured to said tool bar adjacent said lift arm, a second lift arm vertically spaced from the first mentioned lift arm and pivotally connected to said standard, a tool supporting bar vertically connecting said lift arms, a rockable member swingably carried by said standard, the axis of swinging movement of said rockable member and the axis of swingable movement of said second lift arm being substantially co-axial, adjustable means interconnected between said standard and said rockable member at a point remote from its pivotal connection to said standard for securing said rockable member in various angular positions with respect to said standard, a toggle linkage interconnected between said rockable member and the first mentioned lift arm, an actuating link pivotally connected adjacent one end thereof to said toggle adjacent the apex thereof, a transverse rock shaft rotatably supported by said tractor, said rock shaft having formed at one end thereof a rock arm, a power responsive cylinder carried by said tool bar and connected to said rock shaft for rocking said rock shaft in one direction, and a pivotal connection between said rock arm and said actuating link whereby said toggle linkage is caused to buckle in response to said rock shaft's being rocked in said one direction wherein said first mentioned lift arm is moved from a working position to a raised position, said adjusting means being capable of effecting a fine adjustment of said first mentioned lift arm upon said rockable member's being rocked into adjusted angular relationship with respect to said standard.

10. A tractor-mounted cultivator rig for use with a tractor comprising a main tool bar secured to said tractor and extending laterally therefrom, a pair of upwardly extending standards secured to said main tool bar in spaced relationship, a pair of rearwardly disposed lift arms carried between said standards and rockable in unison about the axis of said tool bar, a second pair of lifting arms vertically disposed with respect to the first mentioned pair and pivotally supported by each of said standards for rocking in unison about an axis parallel to the axis of said tool bar, a rockable member pivotally carried by one of said standards at a point spaced upwardly from said tool bar, interconnecting means between said rockable member and said standard for holding said rockable member in various angular positions with respect to said standard, a toggle linkage between said rockable member and one of the first mentioned lift arms for effecting swinging of said lift arm in response to angular adjustment of said rockable member, an actuating link pivotally connected to said toggle adjacent the apex thereof and extending forwardly therefrom, a transverse rock shaft rotatably carried by said tractor, said rock shaft having a rock arm positioned in the plane of said actuating link and pivotally connected thereto, and power operated means carried by said tool bar and connected to said rock shaft for rocking said rock shaft for buckling said toggle for swinging said lift arm into a raised position, said interconnecting means causing a fine adjustment of said lift arm when said lift arm is operatively positioned with respect to the horizontal upon said rockable member's being angularly adjusted.

References Cited in the file of this patent

UNITED STATES PATENTS

| | | |
|---|---|---|
| 815,744 | Rice | Mar. 20, 1906 |
| 2,156,571 | Lindgren et al. | May 2, 1939 |
| 2,309,221 | Smith | Jan. 26, 1943 |
| 2,337,762 | Mott | Dec. 28, 1943 |
| 2,358,298 | Benjamin | Sept. 19, 1944 |
| 2,482,751 | Hartsock | Sept. 27, 1949 |